US012753294B2

(12) United States Patent
Itatsu et al.

(10) Patent No.: US 12,753,294 B2
(45) Date of Patent: Oct. 6, 2026

(54) FLAME-RETARDANT VIBRATION ISOLATION RUBBER COMPOSITION AND FLAME-RETARDANT VIBRATION ISOLATION RUBBER MEMBER

(71) Applicant: Sumitomo Riko Company Limited, Aichi (JP)

(72) Inventors: Fumitomo Itatsu, Aichi (JP); Keiichi Muratani, Aichi (JP); Masashi Okahisa, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 518 days.

(21) Appl. No.: 18/460,597

(22) Filed: Sep. 4, 2023

(65) Prior Publication Data

US 2023/0407058 A1 Dec. 21, 2023

Related U.S. Application Data

(63) Continuation of application No. PCT/JP2022/007490, filed on Feb. 24, 2022.

(30) Foreign Application Priority Data

Mar. 5, 2021 (JP) ................................ 2021-034885

(51) Int. Cl.

| | |
|---|---|
| ***C08L 7/00*** | (2006.01) |
| ***C08K 3/04*** | (2006.01) |
| ***C08K 3/22*** | (2006.01) |
| ***C08K 5/25*** | (2006.01) |

(52) U.S. Cl.

CPC .................. *C08L 7/00* (2013.01); *C08K 3/04* (2013.01); *C08K 3/22* (2013.01); *C08K 5/25* (2013.01); *C08K 2003/2217* (2013.01); *C08K 2003/2227* (2013.01); *C08L 2201/02* (2013.01)

(58) Field of Classification Search

CPC ......... C08L 7/00; C08L 2201/02; C08K 3/04; C08K 3/22; C08K 5/25; C08K 2003/2217; C08K 2003/2227

See application file for complete search history.

(56) References Cited

U.S. PATENT DOCUMENTS

| | | | | |
|---|---|---|---|---|
| 10,479,878 B2 | 11/2019 | Muratani et al. | | |
| 10,487,192 B2 | 11/2019 | Ochiai | | |
| 2014/0329946 A1* | 11/2014 | Horie | C08K 5/54 524/216 | |
| 2017/0152365 A1 | 6/2017 | Muratani et al. | | |
| 2017/0204248 A1* | 7/2017 | Ochiai | C08K 3/36 | |
| 2021/0206944 A1 | 7/2021 | Okahisa et al. | | |

FOREIGN PATENT DOCUMENTS

| | | |
|---|---|---|
| CN | 106414589 | 2/2017 |
| CN | 106574076 | 4/2017 |
| EP | 3170863 | 6/2020 |
| JP | H07166047 | 6/1995 |
| JP | 2004352820 | 12/2004 |
| JP | 2005248155 | 9/2005 |
| JP | 2006047070 | 2/2006 |
| JP | 2015007170 | 1/2015 |
| JP | 2015224279 | 12/2015 |
| JP | 5847262 | 1/2016 |
| JP | 2020164634 | 10/2020 |
| WO | 2020066550 | 4/2020 |

OTHER PUBLICATIONS

"Written Opinion of the International Searching Authority (Form PCT/ISA/237) of PCT/JP2022/007490", mailed on Apr. 26, 2022, with English translation thereof, pp. 1-7.
"Office Action of China Counterpart Application", with English translation thereof, issued on Sep. 24, 2025, pp. 1-12.
"Office Action of Europe Counterpart Application", issued on Apr. 23, 2025, p. 1-p. 4.
"Office Action of Japan Counterpart Application", issued on Aug. 27, 2024, with English translation thereof, p. 1-p. 5.
"Office Action of Japan Counterpart Application", issued on Dec. 3, 2024, with English translation thereof, p. 1-p. 5.
"Office Action of Europe Counterpart Application", issued on Dec. 16, 2024, p. 1-p. 6.
"International Search Report (Form PCT/ISA/210) of PCT/JP2022/007490", mailed on Apr. 26, 2022, with English translation thereof, pp. 1-4.
"Office Action of China Counterpart Application", issued on Dec. 3, 2025, with English translation thereof, p. 1-p. 13.
"Search Report of Europe Counterpart Application", issued on May 23, 2024, p. 1-p. 7.

* cited by examiner

*Primary Examiner* — Robert S Walters, Jr.
(74) *Attorney, Agent, or Firm* — JCIPRNET

(57) ABSTRACT

A flame-retardant vibration isolation rubber composition comprises the following (A) to (D), the proportion of (B) being 20-150 parts by mass, the proportion of (C) being 0.01-5.0 parts by mass, and the proportion of (D) being 10-80 parts by mass with respect to 100 parts by mass of (A), which makes it possible to provide a flame-retardant vibration isolation rubber composition and a flame-retardant vibration isolation rubber member that are excellent in vibration isolation rubber properties such as rubber physical characteristics and dynamic magnification while maintaining flame-retardant property. In the flame-retardant vibration isolation rubber composition, (A) is a diene rubber, (B) is a metal hydroxide, (C) is a dihydrazide compound, and (D) is a carbon black.

6 Claims, No Drawings

FLAME-RETARDANT VIBRATION ISOLATION RUBBER COMPOSITION AND FLAME-RETARDANT VIBRATION ISOLATION RUBBER MEMBER

CROSS-REFERENCE TO RELATED APPLICATIONS

This application is a continuation application of International Application number PCT/JP2022/007490, filed on Feb. 24, 2022, which claims the priority benefit of Japan Patent Application No. 2021-034885 filed on Mar. 5, 2021. The entirety of each of the above—mentioned patent applications are hereby incorporated by reference herein and made a part of this specification.

BACKGROUND

Technical Field

The present disclosure relates to a flame-retardant vibration isolation rubber composition and a flame-retardant vibration isolation rubber member used for vibration isolation applications in vehicles such as automobiles and trains.

Background Art

Generally, vibration isolation rubber members are used in automobiles and railway vehicles in order to reduce vibration and noise. The vibration isolation rubber member is required to have a low dynamic magnification (a decreased value of dynamic magnification [dynamic spring constant (Kd)/static spring constant (Ks)]) in order to improve quietness. In addition, the vibration isolation rubber member is required to have, for example, flame-retardancy, in addition to vibration isolation rubber properties such as a low dynamic magnification. There are methods of adding flame retardants such as halogen-based flame retardants, phosphorus flame retardants, and metal hydroxides to make rubber flame-retardant (for example, refer to Patent Literature 1 and 2).

[Citation List]

[Patent Literature]

[Patent Literature 1]

Japanese Patent Laid-Open No. H7-166047

[Patent Literature 2]

Japanese Patent No. 5847262

However, when flame-retardancy is caused to be exhibited by adding one of the flame retardants described above, a phenomenon in which rubber physical characteristics and a dynamic magnification deteriorate may be observed. For example, when aluminum hydroxide is used as a flame retardant, it is necessary to add a large amount of aluminum hydroxide in order to sufficiently exhibit flame-retardancy, which leads to deterioration of rubber physical characteristics and dynamic magnification.

In Patent Literature 2, the applicant has already developed a technology in which, in order to improve rubber physical characteristics and improve a dynamic magnification while maintaining a flame-retardant effect, specific amounts of a low-melting-point halogen-based flame retardant and small-particle-size aluminum hydroxide in combination are added to diene rubber, which is a polymer of a vibration isolation rubber composition. However, there is still room for improvement in this technology.

The present disclosure has been made in view of the above circumstances, and provides a flame-retardant vibration isolation rubber composition and a flame-retardant vibration isolation rubber member having excellent rubber physical characteristics and vibration isolation rubber properties such as a dynamic magnification while maintaining flame-retardancy.

SUMMARY

The gist of the present disclosure is the following [1] to [5].

[1] A flame-retardant vibration isolation rubber composition including the following (A) to (D), wherein
 with respect to 100 parts by mass of the following (A), the proportion of the following (B) is 20 to 150 parts by mass, the proportion of the following (C) is 0.01 to 5.0 parts by mass, and the proportion of the following (D) is 10 to 80 parts by mass,
 (A) is diene rubber,
 (B) is metal hydroxide,
 (C) is dihydrazide compound, and
 (D) is carbon black.

[2] The flame-retardant vibration isolation rubber composition according to [1],
 wherein the metal hydroxide (B) is at least one selected from among aluminum hydroxide and magnesium hydroxide.

[3] The flame-retardant vibration isolation rubber composition according to [1] or [2],
 wherein the dihydrazide compound (C) is at least one selected from among adipic dihydrazide and isophthalic dihydrazide.

[4] The flame-retardant vibration isolation rubber composition according to any one of [1] to [3],
 wherein the carbon black (D) has a DBP oil absorption amount of 10 to 180 ml/100 g and an iodine adsorption amount of 10 to 200 mg/g.

[5] A flame-retardant vibration isolation rubber member composed of a vulcanized component of the flame-retardant vibration isolation rubber composition according to any one of [1] to [4].

That is, in conventional flame-retardant vibration isolation rubber, since it is necessary to add a large amount of a metal hydroxide in order to obtain flame-retardancy, insufficient dispersion of the metal hydroxide occurs, and rubber physical characteristics and vibration isolation rubber properties such as a dynamic magnification deteriorate. Here, the inventors conducted extensive studies in order to address the above problems, and examined a method of improving rubber physical characteristics and improving vibration isolation rubber properties such as a dynamic magnification (lowering a dynamic magnification) even if a metal hydroxide is used for diene rubber which is a polymer of vibration isolation rubber. Here, as a result of various experiments, it was found that use of a dihydrazide compound and carbon black in combination was effective in improving the dispersibility of the metal hydroxide. Thus, when specific proportions of these materials were incorporated, it was possible to improve vibration isolation rubber properties while maintaining flame-retardancy.

The reason why this is possible is speculated to be as follows. That is, a dihydrazide compound has a function of increasing the crosslink density of rubber and increasing the rubber viscosity. As a result, shear is applied when rubber is kneaded and it is possible to improve the dispersibility of the metal hydroxide in the rubber. In addition, the dispersibility is further promoted by the interaction between the dihydrazide having a polar group and the hydroxyl group of the metal hydroxide. In addition, carbon black has a large specific surface area and a complex microstructure and also has a chemically active surface (having functional groups such as hydroxyl groups and carboxyl groups), and has high reinforcement due to its high reactivity with rubber molecular chains. Therefore, when carbon black is added, shear is applied when rubber is kneaded, and it is possible to further improve the dispersibility of the metal hydroxide in the rubber.

Here, when specific proportions of a metal hydroxide, a dihydrazide compound, and carbon black are combined with diene rubber, which is a polymer of vibration isolation rubber, it is possible to improve the dispersibility due to the interaction between the dihydrazide compound and the metal hydroxide and to improve the dispersibility of the metal hydroxide based on an increase in shear during kneading with the dihydrazide compound and carbon black and thus desired vibration isolation rubber properties can be obtained. Here, the above effects cannot be sufficiently obtained with only one of the dihydrazide compound and carbon black. In addition, even if a monohydrazide compound is used instead of a dihydrazide compound, it is possible to improve the dispersibility of the metal hydroxide and carbon black, but the dihydrazide compound has higher reactivity, and the dispersibility of the metal hydroxide and carbon black is improved, and vibration isolation rubber properties are promoted therewith.

DESCRIPTION OF EMBODIMENTS

As described above, the flame-retardant vibration isolation rubber composition of the present disclosure has excellent effects in flame-retardancy and excellent effects in rubber physical characteristics and vibration isolation rubber properties such as a dynamic magnification. Thus, the flame-retardant vibration isolation rubber composition of the present disclosure can be suitably used as a material for vibration isolation rubber members that require flame-retardancy, for example, engine mounts, stabilizer bushes, suspension bushes and the like used in vehicles such as automobiles and trains, and vibration isolation rubber members in the fields of construction and housing.

Next, embodiments of the present disclosure will be described in detail. However, the present disclosure is not limited to the embodiments.

A flame-retardant vibration isolation rubber composition (hereinafter referred to as "this vibration isolation rubber composition") according to one embodiment of the present disclosure contains specific proportions of the following (A) to (D) as described above.

(A) is diene rubber.

(B) is metal hydroxide.

(C) is dihydrazide compound.

(D) is carbon black.

[Diene Rubber (A)]

Examples of diene rubber (A) used in this vibration isolation rubber composition include natural rubber (NR), butadiene rubber (BR), styrene-butadiene rubber (SBR), chloroprene rubber (CR), isoprene rubber (IR), acrylonitrile-butadiene rubber (NBR), ethylene-propylene-diene rubber (EPDM), butyl rubber (IIR), and chloroprene rubber (CR). These are used alone or two or more thereof are used in combination. Among these, natural rubber is suitably used in consideration of strength and low dynamic magnification.

[Metal Hydroxide (B)]

As the metal hydroxide (B), aluminum hydroxide and magnesium hydroxide are suitably used. Here, these metal hydroxides (B) are used alone or two or more thereof are used in combination. Here, particularly, in consideration of rubber physical characteristics, the metal hydroxide (B) having an average particle size of 2 μm or less is preferable, the metal hydroxide (B) having an average particle size of 1.5 μm or less is more preferable, and the metal hydroxide (B) having an average particle size of 1.1 μm or less is particularly preferable. That is, when metal hydroxide having a small particle size and a large surface area is uniformly dispersed in this manner, it is possible to obtain better rubber physical characteristics. Here, the average particle size of the metal hydroxide (B) is the volume average particle size, and for example, a sample arbitrarily extracted from a population is used, a laser diffraction scattering type particle size distribution measuring device is used for measurement, and thus the average particle size can be derived.

The amount of the metal hydroxide (B) added with respect to 100 parts by mass of the diene rubber (A) is 20 to 150 parts by mass, and preferably 20 to 80 parts by mass. That is, this is because, if the amount of the metal hydroxide (B) added is too small, desired flame-retardancy cannot be obtained, and on the other hand, if the amount of the metal hydroxide (B) added is too large, it causes deterioration of rubber physical characteristics.

[Dihydrazide Compound (C)]

The dihydrazide compound (C) is used to improve the dispersibility of the metal hydroxide (B) and the carbon black (D). Here, as the dihydrazide compound (C), a dihydrazide compound represented by the following General Formula (1) is preferably used.

[Chem. 1]

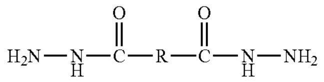

(1)

In General formula (1), R represents an alkylene group having 1 to 30 carbon atoms, a cycloalkylene group having 3 to 30 carbon atoms, or a phenylene group.

In General Formula (1), R is preferably an alkylene group or phenylene group having 4 to 12 carbon atoms.

Here, specific examples of dihydrazide compounds (C) include adipic dihydrazide, isophthalic dihydrazide, phthalate dihydrazide, terephthalate dihydrazide, succinate dihydrazide, azelate dihydrazide, sebacate dihydrazide, oxalate dihydrazide, and dodecanoate dihydrazide. These are used alone or two or more thereof are used in combination. Among these, in consideration of high dispersibility of the metal hydroxide (B) and the carbon black (D), adipic dihydrazide, and isophthalic dihydrazide are preferable.

In consideration of high dispersibility of the metal hydroxide (B) and the carbon black (D) and the like, the content of the dihydrazide compound (C) with respect to 100 parts by mass of the diene rubber (A) is 0.01 to 5.0 parts by mass, preferably 0.1 to 5.0 parts by mass, and more preferably in a range of 0.3 to 3.0 parts by mass.

[Carbon Black (D)]

As the carbon black (D), for example, various grades of carbon black such as SAF grade, ISAF grade, HAF grade, MAF grade, FEF grade, GPF grade, SRF grade, FT grade, and MT grade are used. These are used alone or two or more thereof are used in combination. Among these, FEF grade carbon black is preferably used in consideration of vibration characteristics and fatigue resistance.

Here, in consideration of durability, low dynamic magnification and reinforcement, the carbon black (D) preferably has an iodine adsorption amount of 10 to 200 mg/g. For the same reason, the carbon black (D) preferably has a DBP oil absorption amount (dibutyl phthalate oil absorption amount) of 10 to 180 ml/100 g. Here, when both the iodine adsorption amount and the DBP oil absorption amount are within the above range, it is possible to improve the reinforcement, dispersibility and durability.

Here, the iodine adsorption amount of the carbon black (D) is a value measured according to JIS K 6217-1 (method A). In addition, the DBP oil absorption amount of the carbon black (D) is a value measured according to JIS K 6217-4.

In consideration of fatigue resistance, the amount of the carbon black (D) added with respect to 100 parts by mass of the diene rubber (A) is in a range of 10 to 80 parts by mass, preferably in a range of 10 to 70 parts by mass, and more preferably in a range of 15 to 50 parts by mass.

As an index of the dispersibility of the metal hydroxide (B) and the carbon black (D), the degree of dispersion (ΔG') calculated by the following Formula (i) may be used.

$$\Delta G' = G'2/G'1 \tag{i}$$

[in Formula (i), G'1 is the storage modulus of the unvulcanized rubber composition at a frequency of 11 Hz and a strain of 42% at 40° C., and G'2 is the storage modulus of the unvulcanized rubber composition at a frequency of 11 Hz and a strain of 0.28% at 40° C.]

Here, as described in Japanese Patent Laid-Open No. 2006-47070, ΔG' represented by Formula (i) is an index for evaluating cohesiveness of a filler, and a smaller ΔG' indicates a higher degree of dispersion of the filler. Here, in the present disclosure, ΔG' is preferably less than 2.3 and more preferably 2.1 or less. Here, the lower limit of ΔG' is 0.

In addition, G'1 and G'2 can be measured by, for example, a rubber processing tester, a curelastometer, dynamic viscoelasticity measurement or the like. More specifically, an RPA 2000 (commercially available from Alpha Technology Co., Ltd.) is used for measurement.

Here, in this vibration isolation rubber composition, together with the components (A) to (D), as necessary, a halogen-based flame retardant, an antimony flame retardant, a reinforcing agent, a silane coupling agent, a vulcanizing agent, a vulcanization accelerator, a vulcanization aid, an antioxidant, a process oil and the like can be appropriately added. Particularly, if a silane coupling agent is added, this is preferable because the dispersibility is improved according to an interaction with a metal hydroxide.

As the halogen-based flame retardant, a halogen-based flame retardant having a melting point of 150° C. or lower is preferable because it easily melts when the rubber composition is kneaded and it is less likely to become a starting point of rubber breakage. When a low-melting-point halogen-based flame retardant is used, the Mooney viscosity of the entire rubber composition is lowered so that metal hydroxide and carbon black can be uniformly dispersed in the rubber composition. Examples of such low-melting-point halogen-based flame retardants include low-melting-point bromine-based flame retardants and chlorine-based flame retardants described above. These may be used alone or two or more thereof may be used in combination.

Examples of low-melting-point bromine-based flame retardants include aliphatic retardants such as bis(dibromopropyl)tetrabromobisphenol A (DBP-TBBA), bis(dibromopropyl)tetrabromobisphenol S (DBP-TBBS), tris(dibromopropyl) isocyanurate (TDBPIC), and tris (tribromoneopentyl) phosphate (TTBNPP), and aromatic retardants such as bromine epoxy resins (TBBA epoxy).

In addition, examples of low-melting-point chlorine-based flame retardants include chlorinated paraffin and chlorinated polyethylene.

The amount of the halogen-based flame retardant added with respect to 100 parts by mass of the diene rubber (A) is 15 to 60 parts by mass. That is, this is because, if the amount of the halogen-based flame retardant added is too small, desired flame-retardancy cannot be obtained, and on the other hand, if the addition amount is too large, black smoke is generated by burning, which causes deterioration of light transmittance, and causes deterioration of rubber physical characteristics.

Examples of antimony flame retardants include antimony trioxide, and a retardant having a particle size of 0.5 μm or less is preferable in consideration of flame-retardancy and rubber physical characteristics.

The amount of the antimony flame retardant added with respect to 100 parts by mass of the diene rubber (A) is 0.1 to 30 parts by mass. Specifically, this is because, if the amount of the antimony flame retardant added is too small, desired flame-retardancy cannot be obtained, and on the other hand, if the addition amount is too large, it becomes a starting point for rubber breakage and causes deterioration of rubber physical characteristics.

Examples of reinforcing agents include silica and talc. These are used alone or two or more thereof are used in combination.

The amount of reinforcing agent added with respect to 100 parts by mass of the diene rubber (A) is preferably in a range of 10 to 100 parts by mass and particularly preferably in a range of 20 to 70 parts by mass. That is, this is because, if the addition amount is too small, a certain level of reinforcement cannot be satisfied, and on the other hand, if the addition amount is too large, problems such as an increase in dynamic magnification and deterioration due to an increase in viscosity occur.

As the silane coupling agent, for example, a mercapto-based silane coupling agent, a sulfide-based silane coupling agent, an amine-based silane coupling agent, an epoxy-based silane coupling agent, a vinyl-based silane coupling agent and the like are used alone or two or more thereof are used in combination. Among these, the silane coupling agent is preferably a mercapto-based silane coupling agent or a sulfide-based silane coupling agent because it increases the vulcanization density and is particularly effective in lowering the dynamic magnification and improving durability.

Examples of mercapto-based silane coupling agents include 3-mercaptopropyltrimethoxysilane and 3-mercaptopropyltriethoxysilane. These are used alone or two or more thereof are used in combination.

Examples of sulfide-based silane coupling agents include bis-(3-(triethoxysilyl)-propyl)-disulfide, bis(3-triethoxysilylpropyl)trisulfide, bis-(3-(triethoxysilyl)-propyl)-tetrasulfide, bis(3-trimethoxysilylpropyl)disulfide, bis(2-triethoxysilylethyl)tetrasulfide, bis(2-trimethoxysilylethyl) tetrasulfide, bis(3-triethoxysilylpropyl)disulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 2-trimethoxysilylethyl-N,N-dimethylthiocarbamoyl tetrasulfide, 3-trimethoxysilylpropyl benzothiazolyl tetrasulfide, 3-triethoxysilylpropyl benzothiazole tetrasulfide, 3-triethoxysilylpropyl methacrylate monosulfide, and 3-trimethoxysilylpropyl methacrylate monosulfide. These are used alone or two or more thereof are used in combination.

Examples of amine-based silane coupling agents include 3-aminopropyltriethoxysilane, 3-aminopropyltrimethoxysilane, N-(2-aminoethyl)-3-aminopropyltrimethoxysilane, N-(2-aminoethyl)-3-aminopropylmethyldimethoxysilane, and 3-(N-phenyl)aminopropyltrimethoxysilane. These are used alone or two or more thereof are used in combination.

Examples of epoxy-based silane coupling agents include 2-(3,4-epoxycyclohexyl)ethyltrimethoxysilane, 3-glycidoxypropyltrimethoxysilane, 3-glycidoxypropylmethyldiethoxysilane, 3-glycidoxypropyltriethoxysilane, and 3-glycidoxypropylmethyldimethoxysilane. These are used alone or two or more thereof are used in combination.

Examples of vinyl-based silane coupling agents include vinyltriethoxysilane, vinyltrimethoxysilane, vinyl·tris((β-methoxyethoxy)silane, vinyldimethylchlorosilane, vinyltrichlorosilane, vinyltriisopropoxysilane, and vinyl·tris(2-methoxyethoxy)silane. These are used alone or two or more thereof are used in combination.

The content of these silane coupling agents with respect to 100 parts by mass of the diene rubber (A) is preferably 0.1 to 20 parts by mass and more preferably 0.2 to 10 parts by mass because it is excellent in lowering the dynamic magnification and improving durability.

Here, it is preferable that the metal hydroxide (B) be treated with the silane coupling agent in order to enhance processability during kneading and improve rubber physical characteristics.

Examples of vulcanizing agents include sulfur (powdered sulfur, precipitated sulfur, and insoluble sulfur). These are used alone or two or more thereof are used in combination.

The amount of the vulcanizing agent added with respect to 100 parts by mass of the diene rubber (A) is preferably in a range of 0.3 to 7 parts by mass and particularly preferably in a range of 1 to 5 parts by mass. That is, this is because, if the amount of the vulcanizing agent added is too small, a sufficient crosslinked structure cannot be obtained, and the dynamic magnification and settling resistance tend to deteriorate, and on the other hand, if the amount of the vulcanizing agent added is too large, there is a tendency of heat resistance deteriorating.

Examples of vulcanization accelerators include thiazole-based, sulfenamide-based, thiuram-based, aldehyde ammonia-based, aldehyde amine-based, guanidine-based, and thiourea-based vulcanization accelerators. These are used alone or two or more thereof are used in combination. Among these, sulfenamide-based vulcanization accelerators are preferable because they have excellent cross-linking reactivity.

In addition, the content of the vulcanization accelerator with respect to 100 parts by mass of the diene rubber (A) is preferably in a range of 0.1 to 10 parts by mass and particularly preferably in a range of 0.3 to 5 parts by mass.

Examples of thiazole-based vulcanization accelerators include dibenzothiazyl disulfide (MBTS), 2-mercaptobenzothiazole (MBT), 2-mercaptobenzothiazole sodium salt (NaMBT), and 2-mercaptobenzothiazole zinc salt (ZnMBT). These are used alone or two or more thereof are used in combination.

Examples of sulfenamide-based vulcanization accelerators include N-oxydiethylene-2-benzothiazolylsulfenamide (NOBS), N-cyclohexyl-2-benzothiazolylsulfenamide(CBS), N-t-butyl-2-benzothiazolyl sulfenamide (BBS), and N,N'-dicyclohexyl-2-benzothiazolyl sulfonamide. These are used alone or two or more thereof are used in combination.

Examples of thiuram-based vulcanization accelerators include tetramethylthiuram disulfide (TMTD), tetraethylthiuram disulfide (TETD), tetrabutylthiuram disulfide (TBTD), tetrakis(2-ethylhexyl)thiuram disulfide (TOT), and tetrabenzylthiuram disulfide (TBzTD). These are used alone or two or more thereof are used in combination.

Examples of vulcanization aids include zinc oxide (ZnO), stearic acid, and magnesium oxide. These are used alone or two or more thereof are used in combination.

In addition, the content of the vulcanization aid with respect to 100 parts by mass of the diene rubber (A) is preferably in a range of 0.1 to 10 parts by mass and particularly preferably in a range of 0.3 to 7 parts by mass.

Examples of antioxidants include carbamate-based antioxidants, phenylenediamine-based antioxidants, phenol-based antioxidants, diphenylamine-based antioxidants, quinoline-based antioxidants, imidazole-based antioxidants, and waxes. These are used alone or two or more thereof are used in combination.

In addition, the content of the antioxidant with respect to 100 parts by mass of the diene rubber (A) is preferably in a range of 0.5 to 15 parts by mass and particularly preferably in a range of 1 to 10 parts by mass.

Examples of process oils include naphthenic oil, paraffinic oil, and aromatic oil. These are used alone or two or more thereof are used in combination.

In addition, the content of the process oil with respect to 100 parts by mass of the diene rubber (A) is preferably in a range of 1 to 35 parts by mass and particularly preferably in a range of 3 to 30 parts by mass.

This vibration isolation rubber composition can be prepared, for example, as follows. That is, the diene rubber (A), the metal hydroxide (B), the dihydrazide compound (C), the carbon black (D), and as necessary, a halogen-based flame retardant, an antimony flame retardant, a reinforcing agent, a silane coupling agent, a vulcanization aid, an antioxidant, a process oil and the like are appropriately mixed, and kneading of the mixture starts using a Banbury mixer or the like at a temperature of about 50° C., and kneading is performed at 100 to 160° C. for about 3 to 5 minutes. Next, a vulcanizing agent, a vulcanization accelerator and the like are appropriately added thereto, the mixture is kneaded using an open roller under predetermined conditions (for example, 60° C. ×5 minutes), and thus this vibration isolation rubber composition can be prepared. Then, the obtained this vibration isolation rubber composition is vulcanized at a high temperature (150 to 170° C.) for 5 to 60 minutes, and thus a vibration isolation rubber member (vulcanized component) exhibiting flame-retardancy can be obtained.

Thus, when this vibration isolation rubber composition is used as the material of the vibration isolation rubber member as described above, it is possible to obtain excellent effects in rubber physical characteristics and vibration isolation rubber properties such as a dynamic magnification and excellent flame-retardancy. For this reason, this vibration isolation rubber composition prepared as described above is suitably used for vibration isolation rubber members that require flame-retardancy, for example, engine mounts, stabilizer bushes, suspension bushes and the like used in vehicles such as automobiles and trains. In addition to the above applications, the composition can also be used for applications such as vibration control dampers for computer hard disks, vibration control dampers of general household appliances such as washing machines, and damping (vibration control) devices such as construction damping walls and damping (vibration control) dampers and base isolation devices in the fields of construction and housing. It can be suitably used as a material of the vibration isolation rubber member in the fields of construction and housing.

EXAMPLES

Next, examples will be described together with comparative examples. However, the present disclosure is not limited to these examples.

First, prior to examples and comparative examples, the following materials were prepared.

[NR]
natural rubber
[IR]
Nipol IR2200 (commercially available from Zeon Corporation)
[BR]
Nipol 1220 (commercially available from Zeon Corporation)
[Dihydrazide Compound (i)]
isophthalic dihydrazide (IDH, commercially available from Otsuka Chemical Co., Ltd.)
[Dihydrazide Compound (ii)]
adipic dihydrazide (ADH, commercially available from Otsuka Chemical Co., Ltd.)
[Aluminum Hydroxide]
KH-101 (an average particle size of 1.10 μm, commercially available from KC)
[Magnesium Hydroxide]
Kisuma 5 (an average particle size of 0.9 μm, commercially available from Kyowa Chemical Industry Co., Ltd.)
[Carbon Black]
Shoblack IP200 (an iodine adsorption amount of 14 to 28 mg/g, and a DBP specific surface area of 118 to 132 $m^2$/g, commercially available from Tokai Carbon Co., Ltd.)
[Zinc Oxide]
type 2 zinc oxide (commercially available from Sakai Chemical Industry Co., Ltd.)
[Silane Coupling Agent]
NXT Z45 (commercially available from Momentive Performance Materials)
[Stearic Acid]
beads stearic acid Sakura (commercially available from NOF Corporation)
[Amine-Based Antioxidant]
Ozonone 6C (commercially available from Seiko Chemical Co., Ltd.)
[Wax]
microcrystalline wax (Sunnoc, commercially available from Ouchi Shinko Chemical Industrial Co., Ltd.)
[Halogen-Based Flame Retardant]
bromine-based flame retardant (FCP680G, a melting point of 105 to 115° C., commercially available from Suzuhiro Chemical Co., Ltd.)
[Naphthenic Oil]
Sunthene 410 (commercially available from Japan Sun Oil Co., Ltd.)
[Vulcanization Accelerator]
sulfenamide-based vulcanization accelerator (NOCCELER CZ-G, commercially available from Ouchi Shinko Chemical Industrial Co., Ltd.)
[Sulfur]
Sulfur (commercially available from Karuizawa Refinery)

[Example 1]

100 parts by mass of NR, 1 part by mass of a dihydrazide compound (i), 5 parts by mass of zinc oxide, 2 parts by mass of stearic acid, 1.5 parts by mass of an amine-based antioxidant, 2 parts by mass of a wax, 40 parts by mass of aluminum hydroxide, 40 parts by mass of carbon black, and 5 parts by mass of naphthenic oil were mixed and the mixture was kneaded using a Banbury mixer at 140° C. for 5 minutes. Next, 2.3 parts by mass of sulfur and 1.2 parts by mass of a vulcanization accelerator were added thereto, and the mixture was kneaded using an open roller at 60° C. for 5 minutes to prepare a vibration isolation rubber composition.

[Examples 2 to 13 and Comparative Examples 1 to 8]

As shown in Table 1 and Table 2 below, vibration isolation rubber compositions were prepared in the same manner as in Example 1 except that the amount of each component added was changed.

Using the vibration isolation rubber compositions of examples and comparative examples obtained in this manner, based on the following criteria, respective properties were evaluated. The results are also shown in Table 1 and Table 2 below.

<<ΔG'>>

For each vibration isolation rubber composition, the storage modulus (storage modulus G'1 at a strain of 42% and storage modulus G'2 at a strain of 0.28%) of the unvulcanized rubber composition was measured using RPA2000 (commercially available from Alpha Technology Co., Ltd.) at a frequency of 11 Hz and at 40° C. Then, based on the measurement results, ΔG' represented by the following Formula (i) was calculated.

Here, if ΔG' was 2.1 or less, it was evaluated as "o (very good)," if ΔG' was more than 2.1 and less than 2.3, it was evaluated as "Δ (good)," and if ΔG' was 2.3 or more, it was evaluated as "x (poor)."

$$\Delta G' = G'2/G'1 \quad (i)$$

<<Dumbbell Tensile Test (TB and EB)>>

Each vibration isolation rubber composition was press-molded (vulcanized) under conditions of 150° C. ×20 minutes to prepare a rubber sheet having a thickness of 2 mm. Then, a JIS No. 5 dumbbell was punched out from this rubber sheet, and a dumbbell tensile test (measurement of TB and EB) was performed using this dumbbell according to JIS K 6251.

Here, if the value of tensile strength at break (TB) was 19 MPa or more, it was evaluated as "o (very good)," if the value was 17 MPa or more and less than 19 MPa, it was evaluated as "Δ (good)," and if the value was less than 17 MPa, it was evaluated as "x (poor)."

In addition, if the value of elongation at break (EB) was 500% or more, it was evaluated as "o (very good)," if the value was 400% or more and less than 500%, it was evaluated as "Δ (good)," and if the value was less than 400%, it was evaluated as "x (poor)."

<<Light Transmittance>>

Each vibration isolation rubber composition was press-molded (vulcanized) under conditions of 150° C. ×60 minutes to prepare a 76.2 square mm rubber block having a thickness of 25.4 mm. Then, in order to evaluate flame-retardancy of the rubber block, a light transmittance test for smoke generated when the rubber sheet was burned was performed according to ASTM E662.

Then, if the Ds value (specific optical density) of smoke 4 minutes after heating started in a non-flame or flame test was less than 200, it was evaluated as "o (very good)," if the value was 200 or more and less than 300, it was evaluated as "Δ (good)," and if the value was 300 or more, it was evaluated as "x (poor)."

<<Oxygen Index>>

Each vibration isolation rubber composition was press-molded (vulcanized) under conditions of 150° C. ×20 minutes to prepare a rubber sheet having a thickness of 2 mm. Then, in order to evaluate flammability of this rubber sheet, the minimum oxygen concentration (volume %) required to sustain burning of this rubber sheet, that is, an oxygen index, was measured according to JIS K 7201.

Then, if the oxygen index was 22 volume % or more, it was evaluated as "◎ (excellent)," if the oxygen index was 20 volume % or more and less than 22 volume %, it was evaluated as "o (very good)," if the oxygen index was 19 volume % or more and less than 20 volume %, it was evaluated as "Δ (good)," and if the oxygen index was less than 19 volume %, it was evaluated as "x (poor)."

<<Vibration Isolation Performance>>

Each vibration isolation rubber composition was press-molded (vulcanized) under conditions of 150° C. ×30 minutes to prepare a cylindrical test piece (a diameter of 50 mm and a height of 25 mm), circular metal fittings (a diameter of 60 mm and a thickness of 6 mm) were attached to the upper surface and the lower surface, and a dynamic spring constant (Kd100) and a static spring constant (Ks) were measured according to JIS K 6394. Based on the values, the dynamic magnification (Kd100/Ks) was calculated.

Then, regarding evaluation of vibration isolation performance, if the dynamic magnification was 1.6 or less, it was evaluated as "o (very good)," if the dynamic magnification was more than 1.6 and less than 2, it was evaluated as "Δ (good)," and if the dynamic magnification was 2 or more, it was evaluated as "x (poor)."

TABLE 1

(parts by mass)

| | Example | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| NR | 100 | 100 | 100 | 100 | 100 | 100 | 100 | 100 | 70 | 70 | 100 | 100 | 100 |
| IR | — | — | — | — | — | — | — | — | 30 | — | — | — | — |
| BR | — | — | — | — | — | — | — | — | — | 30 | — | — | — |
| Dihydrazide compound (i) | 1 | 1 | 1 | 1 | 1 | 0.1 | 5 | — | 1 | 1 | 1 | 1 | 1 |
| Dihydrazide compound (ii) | — | — | — | — | — | — | — | 1 | — | — | — | — | — |
| Aluminum hydroxide | 40 | 20 | 150 | 40 | 40 | 40 | 40 | 40 | 40 | 40 | — | 40 | 40 |
| Magnesium hydroxide | — | — | — | — | — | — | — | — | — | — | 40 | — | — |
| Carbon black | 40 | 40 | 40 | 10 | 80 | 40 | 40 | 40 | 40 | 40 | 40 | 40 | 40 |
| Zinc oxide | 5 | 5 | 5 | 5 | 5 | 5 | 5 | 5 | 5 | 5 | 5 | 5 | 5 |
| Silane coupling agent | — | — | — | — | — | — | — | — | — | — | — | — | 0.4 |
| Stearic acid | 2 | 2 | 2 | 2 | 2 | 2 | 2 | 2 | 2 | 2 | 2 | 2 | 2 |
| Amine-based antioxidant | 1.5 | 1.5 | 1.5 | 1.5 | 1.5 | 1.5 | 1.5 | 1.5 | 1.5 | 1.5 | 1.5 | 1.5 | 1.5 |
| Wax | 2 | 2 | 2 | 2 | 2 | 2 | 2 | 2 | 2 | 2 | 2 | 2 | 2 |
| Halogen-based flame retardant | — | — | — | — | — | — | — | — | — | — | — | 20 | — |
| Naphthenic oil | 5 | 5 | 5 | 5 | 5 | 5 | 5 | 5 | 5 | 5 | 5 | 5 | 5 |
| Vulcanization accelerator | 1.2 | 1.2 | 1.2 | 1.2 | 1.2 | 1.2 | 1.2 | 1.2 | 1.2 | 1.2 | 1.2 | 1.2 | 1.2 |
| Sulfur | 2.3 | 2.3 | 2.3 | 2.3 | 2.3 | 2.3 | 2.3 | 2.3 | 2.3 | 2.3 | 2.3 | 2.3 | 2.3 |
| ΔG' | ○ | ○ | Δ | ○ | Δ | ○ | ○ | ○ | ○ | ○ | Δ | ○ | ○ |
| TB | ○ | ○ | ○ | ○ | ○ | ○ | Δ | ○ | ○ | ○ | ○ | ○ | ○ |
| EB | ○ | ○ | ○ | ○ | ○ | ○ | Δ | ○ | ○ | ○ | ○ | ○ | ○ |
| Light transmittance | ○ | Δ | ○ | ○ | ○ | ○ | ○ | ○ | ○ | ○ | ○ | Δ | ○ |
| Oxygen index | ○ | Δ | ◎ | ○ | ○ | ○ | ○ | ○ | ○ | ○ | ○ | ◎ | ○ |
| Vibration isolation performance | ○ | ○ | Δ | ○ | Δ | ○ | ○ | ○ | ○ | ○ | Δ | ○ | ○ |

TABLE 2

| (parts by mass) | Comparative Example | | | | | | | |
|---|---|---|---|---|---|---|---|---|
| | 1 | 2 | 3 | 4 | 5 | 6 | 7 | 8 |
| NR | 100 | 100 | 100 | 100 | 100 | 100 | 100 | 100 |
| IR | — | — | — | — | — | — | — | — |
| BR | — | — | — | — | — | — | — | — |
| Dihydrazide compound (i) | — | 7 | 1 | 1 | 1 | 1 | 1 | 1 |
| Dihydrazide compound (ii) | — | — | — | — | — | — | — | — |
| Aluminum hydroxide | 40 | 40 | 40 | 40 | 10 | 160 | — | 40 |
| Magnesium hydroxide | — | — | — | — | — | — | — | — |
| Carbon black | 40 | 40 | 5 | 90 | 40 | 40 | 40 | — |
| Zinc oxide | 5 | 5 | 5 | 5 | 5 | 5 | 5 | 5 |
| Silane coupling agent | — | — | — | — | — | — | — | — |
| Stearic acid | 2 | 2 | 2 | 2 | 2 | 2 | 2 | 2 |
| Amine-based antioxidant | 1.5 | 1.5 | 1.5 | 1.5 | 1.5 | 1.5 | 1.5 | 1.5 |
| Wax | 2 | 2 | 2 | 2 | 2 | 2 | 2 | 2 |
| Halogen-based flame retardant | — | — | — | — | — | — | — | — |
| Naphthenic oil | 5 | 5 | 5 | 5 | 5 | 5 | 5 | 5 |
| Vulcanization accelerator | 1.2 | 1.2 | 1.2 | 1.2 | 1.2 | 1.2 | 1.2 | 1.2 |
| Sulfur | 2.3 | 2.3 | 2.3 | 2.3 | 2.3 | 2.3 | 2.3 | 2.3 |
| ΔG' | X | Δ | ○ | ○ | ○ | X | ○ | Δ |
| TB | Δ | X | Δ | Δ | ○ | Δ | ○ | Δ |
| EB | Δ | X | Δ | Δ | ○ | Δ | ○ | Δ |
| Light transmittance | ○ | ○ | ○ | ○ | Δ | ○ | X | ○ |
| Oxygen index | ○ | ○ | Δ | ○ | X | ◎ | X | Δ |
| Vibration isolation performance | Δ | Δ | X | X | ○ | X | ○ | X |

As can be clearly understood from the results in Table 1, the rubber compositions of examples had excellent effects in flame-retardancy evaluation (light transmittance, oxygen index), and excellent effects in vibration isolation performance (vibration isolation rubber properties) and tensile physical properties (rubber physical characteristics (TB and EB) in a dumbbell tensile test).

On the other hand, as shown in Table 2, unlike the rubber compositions of examples, the rubber compositions of comparative examples were evaluated as "x (poor)" in one or more evaluation items.

That is, since the rubber composition of Comparative Example 1 did not contain a dihydrazide compound, the dispersibility of aluminum hydroxide was poor, the value of ΔG' was not a desired value, and vibration isolation performance and tensile physical properties were poor in the results. In Comparative Example 2, the amount of the dihydrazide compound added was larger than that specified in the present disclosure, and although flame-retardancy was evaluated as excellent, the rubber was hard, and tensile physical properties and vibration isolation performance were poor in the results. In Comparative Example 3, the amount of carbon black added was smaller than that specified in the present disclosure, and although flame-retardancy was evaluated as excellent, reinforcement of the rubber was poor, and tensile physical properties and vibration isolation performance were poor in the results. In Comparative Example 4, the amount of carbon black added was larger than that specified in the present disclosure, and although flame-retardancy was evaluated as excellent, the hardness of the rubber increased, and tensile physical properties and vibration isolation performance were poor in the results. In Comparative Example 5, the amount of aluminum hydroxide added was smaller than that specified in the present disclosure, and although vibration isolation performance was excellent, flame-retardancy was evaluated as poor in the results. In Comparative Example 6, the amount of aluminum hydroxide added was larger than that specified in the present disclosure, and although flame-retardancy was evaluated as excellent, the value of ΔG' was not a desired value, and tensile physical properties and vibration isolation performance were poor in the results. Since Comparative Example 7 did not contain a metal hydroxide, vibration isolation performance was excellent, but flame-retardancy was evaluated as poor in the results. Since Comparative Example 8 did not contain carbon black, the dispersibility of aluminum hydroxide was poor and reinforcement of the rubber was poor and thus vibration isolation performance and tensile physical properties were poor in the results.

Here, while specific embodiments of the present disclosure have been described in the above examples, the above examples are only examples, and should not be construed as limiting. Various modifications apparent to those skilled in the art are intended to be within the scope of the present disclosure.

Industrial Applicability

This vibration isolation rubber composition is preferably used, for example, as a material for engine mounts, stabilizer bushes, suspension bushes and the like used in vehicles such as automobiles and trains, and also can be used as a material for vibration control dampers for computer hard disks, vibration control dampers of general household appliances such as washing machines, and damping (vibration control) devices such as construction damping walls and damping (vibration control) dampers and members constituting base isolation devices (vibration isolation rubber member).

The invention claimed is:

1. A flame-retardant vibration isolation rubber composition comprising the following (A) to (D), wherein with respect to 100 parts by mass of the following (A), the proportion of the following (B) is 20 to 150 parts by mass, the proportion of the following (C) is 0.01 to 5.0 parts by mass, and the proportion of the following (D) is 10 to 80 parts by mass, (A) is diene rubber, (B) is metal hydroxide, (C) is dihydrazide compound, and (D) is carbon black, wherein a degree of dispersion (ΔG') of the flame-retardant vibration isolation rubber composition, calculated by Formula (i), is 2.3 or less, and an oxygen index measured according to JIS K 7201 is 20 volume % or more, $$\Delta G' = G'2/G'1 \quad (i)$$

in Formula (i), G'1 is a storage modulus of an unvulcanized rubber composition at a frequency of 11 Hz and a strain of 42% at 40° C., and G'2 is the storage modulus of the unvulcanized rubber composition at the frequency of 11 Hz and a strain of 0.28% at 40° C.

2. The flame-retardant vibration isolation rubber composition according to claim 1, wherein the metal hydroxide (B) is at least one selected from among aluminum hydroxide and magnesium hydroxide.

3. The flame-retardant vibration isolation rubber composition according to claim 1, wherein the dihydrazide compound (C) is at least one selected from among adipic dihydrazide and isophthalic dihydrazide.

4. The flame-retardant vibration isolation rubber composition according to claim 1, wherein the carbon black (D) has a DBP oil absorption amount of 10 to 180 ml/100 g and an iodine adsorption amount of 10 to 200 mg/g.

5. The flame-retardant vibration isolation rubber composition according to claim 1, wherein the metal hydroxide (B) is aluminum hydroxide and the proportion of the metal hydroxide (B) is 20 to 40 parts by mass with respect to 100 parts by mass of the diene rubber (A).

6. A flame-retardant vibration isolation rubber member composed of a vulcanized component of the flame-retardant vibration isolation rubber composition according to claim 1.

* * * * *